United States Patent [15] 3,670,982
Henry [45] June 20, 1972

[54] FILM CANISTER

[72] Inventor: James L. Henry, Dayton, Ohio

[73] Assignee: The National Cash Register Company, Dayton, Ohio

[22] Filed: Dec. 2, 1969

[21] Appl. No.: 881,421

[52] U.S. Cl..............................242/71.2, 242/197
[51] Int. Cl......................................G03b 1/04, G03b 23/06
[58] Field of Search...............242/71.1, 71.2, 197, 198, 199, 242/200; 352/72, 78; 95/34 R

[56] References Cited

UNITED STATES PATENTS

| 2,719,679 | 10/1955 | Nerwin et al. | 242/71.1 |
| 3,288,389 | 11/1966 | Gersch et al. | 242/71.1 |
| 3,317,154 | 5/1967 | Leslie | 242/71.2 |

FOREIGN PATENTS OR APPLICATIONS

| 424,358 | 1/1926 | Germany | 242/71.1 |
| 622,646 | 5/1949 | Great Britain | 242/71.1 |

Primary Examiner—George F. Mautz
Attorney—Louis A. Kline, Wilbert Hawk, Jr. and George J. Muckenthaler

[57] ABSTRACT

A canister for film, tape, or like material wherein the film is propelled by means exterior of the canister during the winding and unwinding thereof. The canister includes a deflection spring pivotally connected thereto, extending in the free state across a chordal portion of the canister, and adapted to be moved in a direction to conform with the interior surface of the canister wall when film is pressed against the spring upon winding of the film within the canister. The spring is deflected by reason of the increasing pressure of the film loops thereagainst to permit a greater length of film to be coiled inside the canister.

7 Claims, 5 Drawing Figures

PATENTED JUN 20 1972 3,670,982
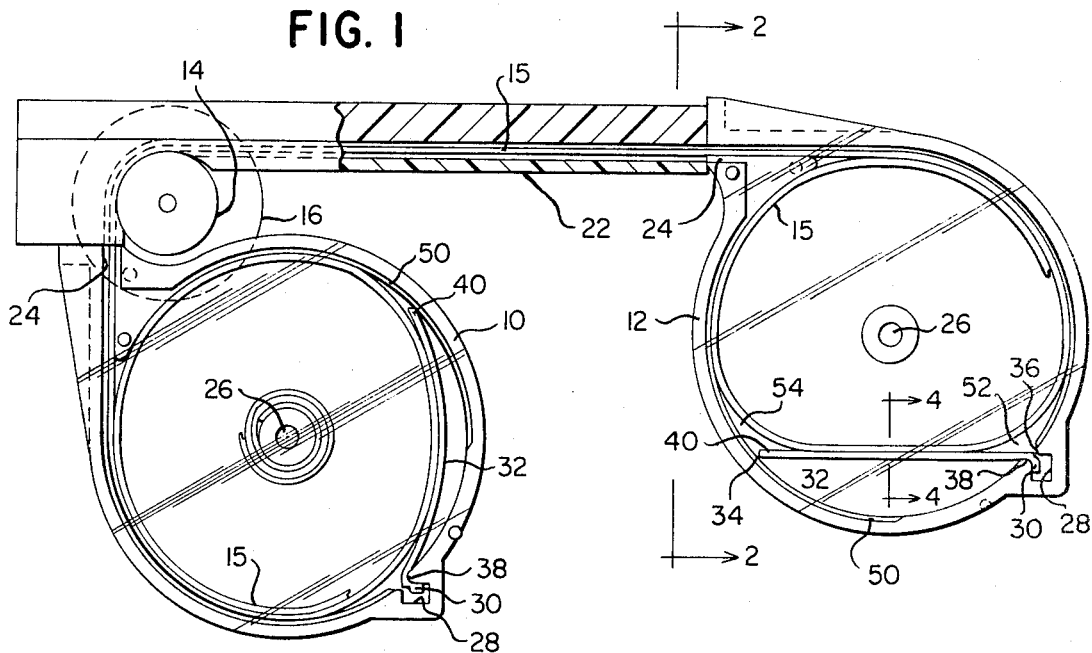
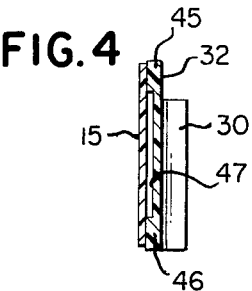
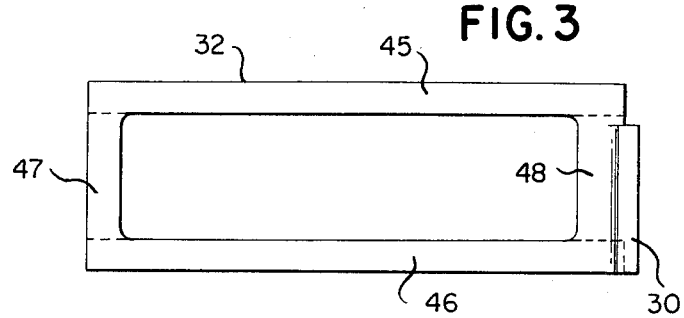
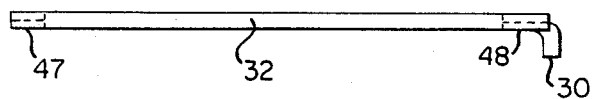
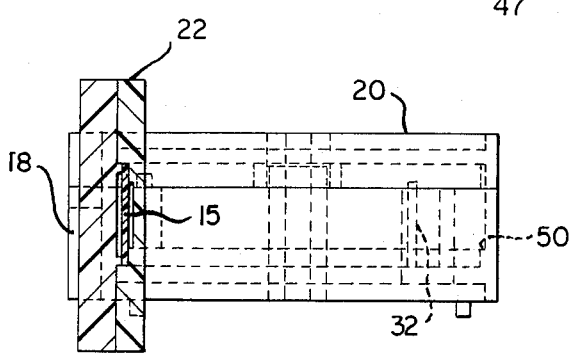
INVENTOR
JAMES L. HENRY
BY Louis A. Kline
Wilbert Hawk, Jr.
George J. Truckenthaler
HIS ATTORNEYS

FILM CANISTER

BACKGROUND OF THE INVENTION

The use of canisters, cartridges, or reels for containing and dispensing film or like material has been well known in the field of photographic equipment such as cameras and projectors provided with a supply and a take-up canister or reel. Various guide and control means have been devised for delivering and receiving the film as it is being moved through such equipment from one canister or reel to another, as, for example, wherein one or both of the supply and take-up canisters have driving or driven elements therewithin for controlling the movement and the placement of the film. In this regard, the film is controlled by reason of the positive drive exerted thereon during its travel through use of sprockets or other like film-engaging driving members.

As the art progressed, the driving and driven elements within the canister were eliminated in favor of an exterior drive, and the film was drawn from the supply canister and forced into the take-up canister, thus relying on the adaptability of the film to coil itself therein without additional means for controlling the placement of the film in a precise manner. It can be realized that, without a drive or control member within the canister, the film will seek its own path of coil during the film take-up condition; that is, is free to select a path of least resistance when being propelled therein.

Various ways and means have been used in the past to provide guide or control of the film as it is being propelled by external drive means from one spool or canister to another. In U.S. Pat. No. 2,364,381, issued Dec. 5, 1944, on the application of Joseph Mihalyi, there is shown a film-roll-holding camera having a cylindrical casing for receiving the film, the casing including a light spring formed in circular fashion for helping the film to coil in a loose coil when it is propelled into the cylindrical chamber. Another example of prior art is U.S. Pat. No. 3,288,389, issued Nov. 29, 1966, on the application of Josef Gersch and Heinz Meglin, which patent shows a film cartridge constructed and assembled to compel a length of film to assume a truly circular shape when the film is introduced into the interior of the housing. The housing provides a coreless film cartridge having at least one expansible elastic band mounted in the housing and comprising a loop portion whose circumferential length in unexpanded condition of the band is less than the maximum length of the roll to be formed and which portion expands in response to continued admission of the film; that is, in response to the gradually-increasing diameter of the roll.

While these prior devices aid in guiding the film in a circular path, the thickness of the film necessitates that the coils become decreasing in diameter as additional film is fed into the canister or chamber. The first, or outer, loop assumes a diameter which is substantially that of the canister, whereas successive inner loops must be smaller in diameter due to the interior surface of the canister being fixed. In view of the decreasing diameter of subsequent loops of film, the frictional forces between adjacent coils of film tend to build up rather quickly. At some point, these forces become greater than the ability of the film to withstand a clear-cut guided path within the canister, and a jam may result by reason of the drive member's forcing the film against the large frictional forces. By reason of this, a canister of given diameter will accept a minimal length of film only before external forces prevent further acceptance of film. Additionally, the film coils are in direct contact with each other and must slip relative to each other, so that, in the process of slipping, the images on the film may be damaged. It is therefore desirable that means be provided in a canister to allow the maximum length of film to be propelled or inserted therein and without damage to the film.

SUMMARY OF THE INVENTION

The present invention relates to containers for film, tape, or like material and more particularly to a film canister utilized as a take-up device wherein the film is controlled as it is being propelled or forced into the canister. The canister is a hollow cylindrical enclosure having rigid walls assuring a continuously curved inside diameter for reception of the film in a generally circular fashion.

A deflection spring or like member is pivotally connected within the canister at a point approximately diametrically opposite the film entrance, and such spring, in its free state, occupies a chordal position in relation to the circumference of the canister. When the film first enters the canister through a slot entrance, or throat, the leading edge of the first coil is guided around the inside wall of the canister until it contacts the deflection spring, where said leading edge is diverted from the inside wall along a path dimensionally less than the canister diameter. As the edge continues around in the shape of a coil, it again contacts the wall of the canister at a point beyond the spring and then passes the entrance slot, where it is adjacent the first loop. Additional feeding of the film into the canister exerts pressure against the already-contained coil, which, in turn, presses against the spring and forces it outwardly in a direction to conform with the canister wall; that is, in a direction approaching the inner peripheral surface of the canister.

The first coil of the film leaves a void, or corner space, at the intersection of each end of the spring and the canister wall, which void becomes gradually smaller as the canister becomes filled by reason of the spring deflection. This void, or space, enables the first few coils of film to increase in diameter a certain amount while at the same time permitting easier slippage of adjacent coils as the spring is deflected outwardly. Many more coils of film may thus be propelled and placed within the canister.

The spring is flexible in the radial direction of the canister but is substantially rigid when compared to the characteristics of the film. While the spring may follow any one of numerous constructions, such, for example, being a thin plate or sheet of metal or plastic, being a pair of spaced rails joined at the ends, or even being a formed wire element, its central portion is desirably not as thick as the peripheral portions, so that the film image does not come into contact with the spring as it is guided thereby.

In line with the above discussion, the principal object of the present invention is to provide means permitting additional length of film to be inserted into a container.

Another object of the present invention is to provide a deflection member, within a film canister, which moves outwardly in response to pressure from additional coils of film, whereby the initial coils of film are changed from an irregular pattern to a substantially circular pattern to gain a greater length of film within the canister.

An additional object of the present invention is to provide a deflection member which prohibits the initial coils of film, propelled into a circular canister, from assuming a circular shape, so that subsequent coils of film may slidably press the initial coils into the unused space, wherein the coils are permitted to subsequently follow a substantially circular path.

A further object of the present invention is to provide a deflection member, in a film canister, which causes pockets to be formed at its ends, thus reducing frictional forces between adjacent coils of film and permitting additional coils to press the deflection member outwardly in a direction approaching the periphery of the canister.

Additional advantages and features of the present invention will become apparent and fully understood from a reading of the following description taken together with the annexed drawing, in which:

FIG. 1 is a top plan view of a pair of film canisters in working relationship, and incorporating the present invention;

FIG. 2 is a view of the canister taken on the line 2—2 of FIG. 1;

FIG. 3 is a front detail view of the preferred form of the deflection member;

FIG. 4 is a view in section taken on the line 4—4 of FIG. 1; and

FIG. 5 is an enlarged view of the deflection member shown in FIG. 1.

Referring to FIG. 1, there is shown film-containing and -driving apparatus comprising a supply canister 10, a take-up canister 12, and means for driving or propelling a film 15 from one canister to the other, this means including a sprocket 14 connected to a motor 16 supported adjacent the supply canister 10. The canisters are shown as being of a clear plastic material, with each canister having a bottom portion 18 and a top portion 20 (FIG. 2) placed together to form an enclosure for the film 15. The canisters are interchangeable in that the take-up canister may be used for the supply canister, or vice versa, by being turned over and placed in the desired position. The film travels from one canister to the other through a guide or passageway 22, that portion of the film traveling at any one time between the canisters being readily positioned to be used for projection or display purposes or whatever other use may be desired.

Since the canisters are substantially identical in construction, it is necessary to describe only one in detail to understand the present invention. The canister 12, which is shown as the take-up unit, has a throat 24 adjacent one end of the passageway 22, through which the film 15 is driven prior to being received within the canister. A spindle 26 is centrally located within the canister to support and maintain the unit in proper relationship with the other parts of the apparatus. At a point approximately diametrically opposite the throat 24 is a recess 28 extending within the wall of the canister, and placed within said recess is one end 30 of a deflection member 32. In its free state, the member 32 defines a chord on the circumference of the canister wall, extending in a straight line between two points, 34 and 36 (FIG. 1), on the inner curve of the canister. The member 32 is resilient or spring-like in construction but is sufficiently rigid to maintain its position across the chord of the canister wall in upstanding manner, and additionally is more rigid than a single layer of the film 15. The member 32 may be made of plastic, fiber, or light metal which is sufficiently resilient to respond to the increasing and decreasing pressures of the film. As illustrated, the member 32 is pivoted on a corner 38 of the recess 28 by reason of a turn at its one end 30, its other end, 40, being free to swing away from the point 34 on the curve of the canister wall.

As seen in FIGS. 3, 4, and 5, the resilient member 32, in its preferred form, assumes the construction of a hinge characterized by spaced rails 45 and 46 joined at their ends by connecting portions 47 and 48, it being observed that the portions 47 and 48 are of lesser thickness than the rails 45 and 46. As seen in FIG. 4, the film 15, when in contact with the member 32, rides along the spaced rails 45 and 46 so as not to damage the image on the film, which, of course, is contained within the central area of the film, and hence freely between said rails. Additionally, the construction of the inner wall of the canister is different in those areas with which the film 15 may come into contact, such as being provided with a ledge 50 therealong (FIGS. 1 and 2). In this way, the film is likewise held away from the canister wall, so as to avoid any damage to the image thereon.

Referring back to FIG. 1, as the film 15 is initially propelled from the supply canister 10 through its throat 24, through the passageway 22, and into the right-hand, or take-up, canister 12, the first coil or loop of film 15 engages the deflection member 32 and assumes thereat a radius smaller than that of the canister. By assuming this smaller radius, voids or pockets 52 and 54 are formed at the intersection of each end of the deflection member 32 and the canister wall, because the film pressure of one coil is not sufficient to force the spring member outward. These pockets are the result of the smooth arc obtained by the first film coil as it is moved along from the container wall to the deflection member 32 and again as the film is guided from the member to the wall. As additional coils or loops of film are driven into the canister, the pressure of the preceding coils builds up and causes the outer coils to seek a position of increased diameter. This is accomplished by means of the deflection member 32, which is deflected in the direction to more nearly form an arc of the canister wall circle rather than the line of a chord. As the deflection member is deflected outwardly, the pockets become smaller, and the initial coils are able to occupy a greater part of this space. It is understood, of course, that, as the coils of film are propelled into the canister, adjacent coils must slip relative to each other in pursuing a path around the inside of the canister; hence, as the coils pass the pocket areas, this slippage is accomplished with very little radial force being imposed on the adjacent coils, as the entering coils are allowed to expand into the pockets, and frictional contact is thereby reduced. Because the diameters of the film coils are increasing by reason of the deflecting spring member 32 and the available pocket space adjacent the ends thereof, the restraining force is decreased to permit easier slippage of adjacent coils of film. Such use of the deflection member increases as much as fourfold the length of film which may be inserted into a canister of given size, together with a measurable reduction in film wear.

Of course, as the film is propelled from the supply canister to the take-up canister, the deflection member in the supply unit is relaxed and assumes the position of a chord through the points on the circular wall of the canister. In this respect, the film is very simply controlled and effectively contained throughout its travel from one canister to the other.

Although the deflection member 32 is shown as being pivotally connected to the canister wall on the corner 38, the design may be altered to provide abutment or stop means, for instance, at the point 34 on the curve of the canister, to prevent the member from traveling or sliding as the film is propelled into the canister and around its wall. This may also be accomplished by means of a slot or notch in the wall to hold or retain the end 40 at the point 34.

It is thus seen that herein shown and described is a film apparatus which provides for increased capacity in a given canister system and which apparatus accomplishes all the features and advantages mentioned above. While only one embodiment has been disclosed, certain variations on the above may occur to those skilled in the art, so it is contemplated that all such variations having these features are within the scope of the invention.

What is claimed is:

1. A film canister comprising an enclosure of circular formation having a throat for
   admitting film into the enclosure, the film being propelled by a driver external of the canister, and a
   resilient member within the enclosure, pivotally connected at one end thereof to the enclosure and being free at the other end to move along the enclosure, said member occupying the position of a chordal line between two points of its intersection with the curve of the enclosure, said member being contactable by said film upon being received within the enclosure and being outwardly deflectable in a direction away from the axis of the enclosure and assuming a position conforming with the curvature of the circular formation by reason of the film being admitted in said enclosure and pressing against said resilient member.

2. The canister of claim 1 wherein the resilient member is a thin plate with its central area removed.

3. In a canister for receiving film propelled by external means, the improvement comprising a resilient plate adaptable to respond to increasing and decreasing pressures of the film thereagainst and pivotally connected at one end thereof with the canister in a wall portion thereof, the other end being free to move along the wall in response to increasing or decreasing pressure by the coils of film, said plate extending in chordal fashion from the pivotal connection and adapted to be engaged by the film as it is received into the canister, the plate initially restraining the film in a chordal path across the canister and subsequently deflecting outwardly in relation to the center of the canister to conform to the shape thereof as additional film is received therein.

4. The canister of claim 3 wherein the resilient plate includes edge portions only contactable by the edges of the film.

5. The canister of claim 3 wherein the resilient plate includes a pair of spaced rails connected by end portions, the end portions being of lesser dimension in thickness than the rails.

6. Film-containing apparatus having a supply canister and a take-up canister, means for propelling the film from one canister to the other, and means within the take-up canister for controlling film as it is being propelled therein, said controlling means comprising a resilient plate pivotally connected at one end thereof to a wall of the canister, and the other end being freely movable along the wall, and the plate being responsive to increasing and decreasing pressures of the film thereagainst, and extending across a chordal portion of the canister in undeflected condition, said plate being contactable by the film as it is propelled from the supply canister to the take-up canister, said plate restraining the initial coil of film along a path of lesser diameter adjacent the chordal portion, and deflecting outwardly by reason of increased pressure from additional coils of propelled film, and assuming a position conforming with the curvature of the canister upon loading thereof.

7. The apparatus of claim 6 wherein each canister includes a resilient plate responsive to increasing and decreasing pressures of the film thereagainst, the plates being alternately deflected upon transfer of the film from one canister to the other.

* * * * *